(No Model.)
B. F. ADAMS.
Revolving Glass Cutter.
No. 229,228. Patented June 29, 1880.
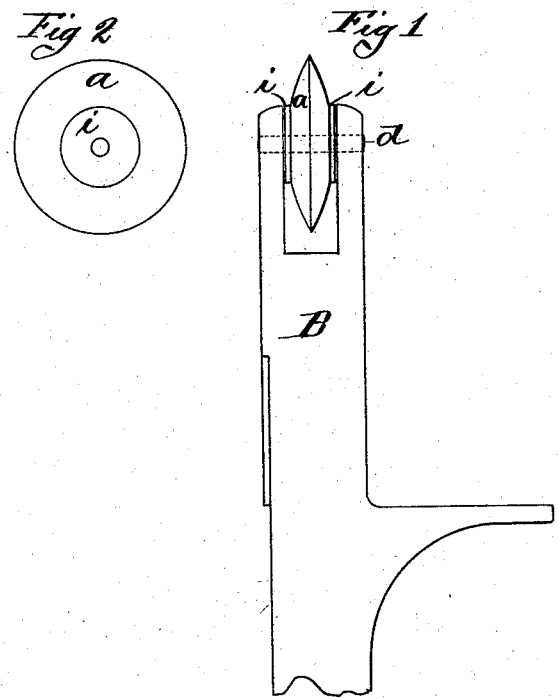
Witnesses
Wm H Chapin
Chas Bill
Inventor
Benjamin F Adams
By Henry A Chapin
Atty.

UNITED STATES PATENT OFFICE.

BENJAMIN F. ADAMS, OF SPRINGFIELD, MASSACHUSETTS.

REVOLVING GLASS-CUTTER.

SPECIFICATION forming part of Letters Patent No. 229,228, dated June 29, 1880.

Application filed May 28, 1880. (No model.)

*To all whom it may concern:*

Be it known that I, BENJ. F. ADAMS, a citizen of the United States, residing at Springfield, in the county of Hampden and State of Massachusetts, have invented certain new and useful Improvements in Revolving Glass-Cutters, of which the following is a specification.

My invention relates to that class of glass-cutting tools which operate by causing a sharp-edged rotating cutter to form the breaking-line upon a glass plate, and the object thereof is to provide an improved form of cutter for such purposes which will so wear as to retain its cutting properties longer than those heretofore made and used, and one which is of such improved form as to provide, while answering the last-named requirement, for the best form for sustaining the cutting-edge against the operative strain upon it, and for bringing the force which is exerted upon the cutter to make it form the breaking-line in the glass to bear centrally upon the axis of the cutter instead of to one side of it; and, furthermore, to provide a cutter in which the distribution of metal is such that in tempering and hardening no inconvenience arises from frequent breakages by reason of unequal shrinkage.

I attain the above-named objects by the construction and form of cutter illustrated in the accompanying drawings, in which—

Figure 1 is an enlarged edge view of one end of the cutter-tool, showing an edge view of the cutter therein. Fig. 2 is an enlarged side view of my improved cutter.

Cutting-rollers of this class have heretofore been constructed with their opposite sides diverging very rapidly from the edge of the cutter and extending in such direction so nearly to the axis of the cutter-roller as to cause the latter at that point to possess such a thickness, compared to that at and near its edge, as to occasion no little inconvenience and loss from breakage in tempering and hardening them, for it should be understood that such cutters, to be serviceable, must be made as hard as possible.

Also, cutters possessing the general form above described necessarily have such a thick cutting-edge that, after very slight wear, they cut badly, and frequently with such difficulty as to break the glass rather than to cut the breaking-line in its surface, and sometimes the cutting-edge has been formed to one side of the peripheral center of the roller, thus causing the latter to "cant" on its axis, and be thus hindered from such freedom of revolution as is essential to revolving cutters when used to operate upon glass for this purpose.

My improved form of roller-cutter obviates the before-mentioned objections and inconveniences, and provides one which operates to do its work much more satisfactorily than those just named, and one which can be easily resharpened with a hone.

I construct my roller-cutters $a$ with the cutting-edge located centrally between the outer face of its hubs $i\ i$, and with that portion of its sides surrounding said hubs and between the latter and said cutting-edge of lenticular form, as shown. Thus the cutting-edge is supported with sufficient strength of metal just below it to make it strong, and still not too thick to permit of considerable wear on its edge without causing the latter to become too thick to be practically useful; and the body of metal is kept away from the edge and nearer the center of the roller, making it easy to temper and harden it without causing the edge, by reason of uneven shrinkage, to chip and crack off and to break in use.

In order to avoid making the entire body of the roller too thick, and yet get a sufficient length of axial bearing to make the cutter revolve steadily on its axial bearing-shaft $d$, I form a hub, $i$, on each side of the roller, as shown.

This roller-cutter is mounted in a metallic tool, B, as shown, and is operated in the usual manner of using such tools to mark or cut the breaking-line upon a plate of glass, and for other similar purposes.

What I claim as my invention is—

1. The improved glass-cutting roller herein described and shown, constructed with the hubs $i\ i$ upon each side thereof, and with its sides between said hubs and its cutting-edge made of lenticular form, as shown, and having its cutting-edge located centrally between the outer faces of said hubs, substantially as and for the purpose set forth.

2. The combination, with the tool B, having its roller end constructed substantially as shown, of the cutting-roller having the hubs $i$ $i$ upon each side thereof, and its sides made of lenticular form between said hubs and its cutting-edge, and said edge located centrally between the outer faces of said hubs, substantially as and for the purpose set forth.

BENJAMIN F. ADAMS.

In presence of—
 WM. H. CHAPIN,
 JAMES WILSON.